US012068548B2

(12) United States Patent
Kim et al.

(10) Patent No.: US 12,068,548 B2
(45) Date of Patent: Aug. 20, 2024

(54) ANTENNA

(71) Applicant: Samsung Electro-Mechanics Co., Ltd., Suwon-si (KR)

(72) Inventors: Chin Mo Kim, Suwon-si (KR); Juhyoung Park, Suwon-si (KR); Hyunjun Choi, Suwon-si (KR); Jae Yeong Kim, Suwon-si (KR); Sungyong An, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 147 days.

(21) Appl. No.: 17/969,888

(22) Filed: Oct. 20, 2022

(65) Prior Publication Data

US 2023/0187832 A1 Jun. 15, 2023

(30) Foreign Application Priority Data

Dec. 9, 2021 (KR) ........................ 10-2021-0176005

(51) Int. Cl.
*H01Q 9/04* (2006.01)

(52) U.S. Cl.
CPC ........... *H01Q 9/045* (2013.01); *H01Q 9/0414* (2013.01)

(58) Field of Classification Search
CPC ............................ H01Q 9/045; H01Q 9/0414
See application file for complete search history.

(56) References Cited

U.S. PATENT DOCUMENTS

2016/0020165 A1 1/2016 Kamgaing et al.
2019/0198434 A1 6/2019 Chen et al.

FOREIGN PATENT DOCUMENTS

KR 10-2019-0052486 A 5/2019

*Primary Examiner* — Graham P Smith
(74) *Attorney, Agent, or Firm* — NSIP Law

(57) ABSTRACT

An antenna includes a first insulating layer; a second insulating layer disposed on the first insulating layer in a height direction; a third insulating layer disposed between the first and second insulating layers, a feed via including a first portion passing through the first insulating layer, a second portion passing through the second insulating layer, and a third portion passing through the third insulating layer and connected to the first and second portions; and an antenna patch disposed on the first insulating layer and fed from the feed via, wherein a permittivity of the third insulating layer is lower than permittivities of the first and second insulating layers, and in a direction perpendicular to the height direction, a width of the third portion is wider than a width of the first portion and/or a width of the second portion.

20 Claims, 19 Drawing Sheets

ANTENNA

CROSS-REFERENCE TO RELATED APPLICATIONS

This application claims the benefit under 35 USC 119(a) of Korean Patent Application No. 10-2021-0176005 filed on Dec. 9, 2021, in the Korean Intellectual Property Office, the entire disclosure of which is incorporated herein by reference for all purposes.

BACKGROUND

1. Field

This application relates to an antenna.

2. Description of Related Art

The development of wireless communication systems has significantly changed lifestyles over the past 20 years. Advanced mobile systems with gigabit per second data rates are needed to support potential wireless applications such as multimedia devices, Internet of Things, and intelligent transportation systems. This is not feasible with the limited bandwidth in the current 4G communication system. To overcome the bandwidth limitation, the International Telecommunication Union has allocated the millimeter wave (mmWave) spectrum for a potential 5G application range. Since then, there has been a lot of interest in research on mmWave antennas in both academia and industry.

There has been a demand for downsizing a mmWave 5G antenna module for a mobile device. As mobile devices such as mobile phones become slimmer, the size of the antenna module also needs to be decreased.

However, as the size of the antenna module decreases, antenna performance such as antenna gain and bandwidth may be deteriorated.

The above information disclosed in this Background section is only for enhancement of understanding of the background of the described technology, and therefore it may contain information that does not constitute prior art that is already known in this country to a person of ordinary skill in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an antenna includes a first insulating layer; a second insulating layer disposed on the first insulating layer in a height direction; a third insulating layer disposed between the first insulating layer and the second insulating layer; a feed via including a first portion passing through the first insulating layer, a second portion passing through the second insulating layer, and a third portion passing through the third insulating layer and connected to the first portion and the second portion; and an antenna patch disposed on the second insulating layer and fed from the feed via, wherein a permittivity of the third insulating layer is lower than a permittivity of the first insulating layer and a permittivity of the second insulating layer, and in a direction perpendicular to the height direction, a width of the third portion of the feed via is wider than either one or both of a width of the first portion of the feed via and a width of the second portion of the feed via.

A thickness of the third insulating layer may be thinner than a thickness of the first insulating layer and a thickness of the second insulating layer, measured in the height direction.

The third insulating layer may have an adhesive property.

The width of the third portion may be wider than the width of the first portion, and may be wider than the width of the second portion.

The width of the third portion may be substantially the same as or smaller than a width of the antenna patch.

The width of the third portion may be wider than the width of the first portion; and the width of the third portion may be substantially the same as the width of the second portion.

The width of the third portion may be wider than the width of the second portion; and the width of the third portion may be substantially the same as the width of the first portion.

The width of the first portion of the feed via may be constant in the height direction; the width of the second portion of the feed via may be constant in the height direction; and the width of the third portion of the feed via may vary in the height direction.

The width of the third portion of the feed via may gradually decrease moving away from the first portion toward the second portion in the height direction.

The width of the third portion of the feed via may gradually increase moving away from the first portion toward the second portion in the height direction.

A planar shape of the third portion of the feed via may be substantially the same as a planar shape of the first portion of the feed via and a planar shape of the second portion of the feed via.

A planar shape of the third portion of the feed via may be substantially the same as a planar shape of the antenna patch.

The planar shape of the third portion of the feed via and the planar shape of the antenna patch may be polygonal shapes.

In another general aspect, an antenna includes a first insulating layer; a second insulating layer disposed on the first insulating layer in a height direction; a third insulating layer disposed between the first insulating layer and the second insulating layer and having a lower permittivity than a permittivity of the first insulating layer and a permittivity of the second insulating layer; a first feed via passing through the first insulating layer; a second feed via including a first portion passing through the first insulating layer, a second portion passing through the second insulating layer, and a third portion passing through the third insulating layer and connected to the first portion and the second portion; a first antenna patch disposed on the first insulating layer and fed from the first feed via; and a second antenna patch disposed on the second insulating layer and fed from the second feed via, wherein a width of the third portion of the second feed via is wider than either one or both of a width of the first portion of the second feed via and a width of the second portion of the second feed via.

A thickness of the third insulating layer may be thinner than a thickness of the first insulating layer and a thickness of the second insulating layer, measured in the height direction.

The third insulating layer may have an adhesive property.

The antenna may further include a plurality of connecting members disposed on a lower surface of the first insulating layer opposite to an upper surface of the first insulating layer on which the third insulating layer is disposed.

The plurality of connecting members may include a plurality of first connecting members connected to the first feed via and the second feed via; and a plurality of second connecting members disposed along edges of the lower surface of the first insulating layer.

The antenna may further include a ground via passing through the first insulating layer between the first feed via and the second feed via and connected to the first antenna patch.

The plurality of connecting members may further include a third connecting member connected to the ground via.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
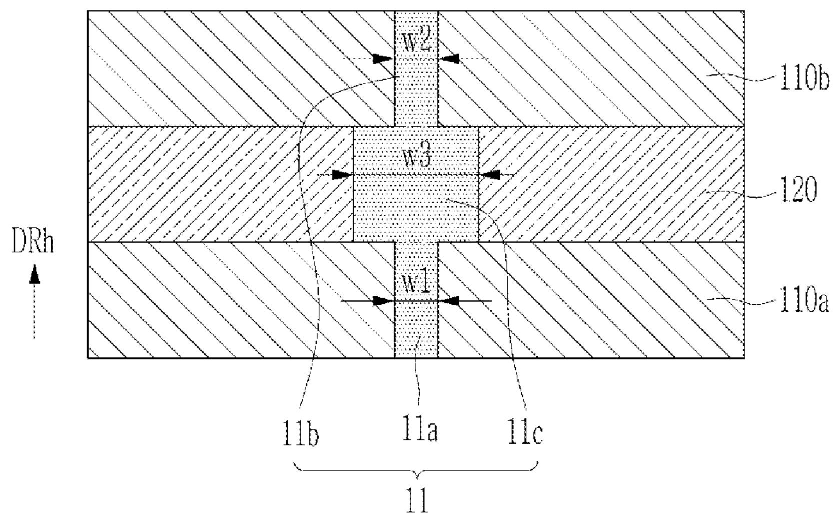
FIG. 1A illustrates a cross-sectional view of a via according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, patterns, vias, planes, lines, and electrical connection structures may include metal materials (e.g., conductive materials such as copper (Cu), aluminum (Al), silver (Ag), tin (Sn), gold (Au), nickel (Ni), lead (Pb), titanium (Ti), or their alloys), and may be formed by plating methods such as chemical vapor deposition (CVD), physical vapor deposition (PVD), sputtering, a subtractive process, an additive process, a semi-additive process (SAP), or a modified semi-additive process (MSAP), but the plating methods are not limited thereto.

Throughout the specification, a dielectric layer and/or an insulating layer may be implemented with FR4, a liquid crystal polymer (LCP), a low temperature co-fired ceramic (LTCC), a thermosetting resin such as an epoxy resin, a thermoplastic resin such as a polyimide, a material in which any of the above-noted resin and an inorganic filler are impregnated into a core material such as glass fibers (or a glass cloth or a glass fabric), a pre-preg, an Ajinomoto Build-up Film (ABF), Bismaleimide Triazine (BT), a photoimageable dielectric (PID) resin, a copper clad laminate (CCL), glass, or a ceramic-based insulator.

Throughout the specification, a radio frequency (RF) signal may have a format according to Wi-Fi (IEEE 802.11 family, etc.), WiMAX (IEEE 802.16 family, etc.), IEEE 802.20, LTE (long term evolution), Ev-DO, HSPA+, HSDPA+, HSUPA+, EDGE, GSM, GPS, GPRS, CDMA, TDMA, DECT, Bluetooth, 3G, 4G, 5G, and any other wireless and wired protocols designated thereafter, but is not limited thereto.

Figure 1B:
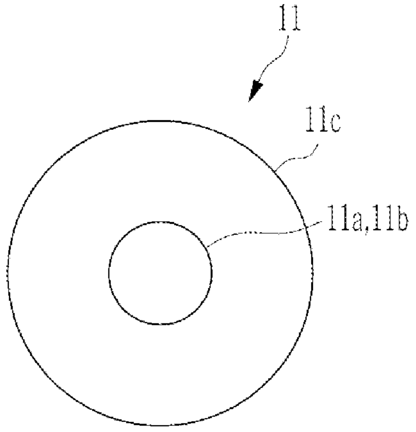
FIG. 1B illustrates a top plan view of the via of FIG. 1A according to an embodiment.
Figure 1C:
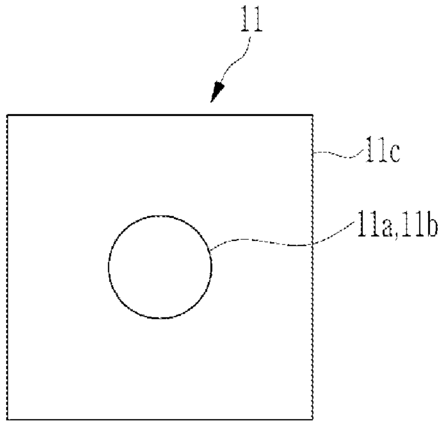
FIG. 1C illustrates a top plan view of the via of FIG. 1A according to another embodiment.

A structure of a via according to an embodiment will be described with reference to FIG. 1A and FIG. 1B. FIG. 1A illustrates a cross-sectional view of the via according to the embodiment, and FIG. 1B illustrates a top plan view of the via according to the embodiment.

First, referring to FIG. 1A, a via 11 according to an embodiment may be disposed through a first insulating layer 110*a*, a second insulating layer 110*b*, and a third insulating layer 120 disposed between the first insulating layer 110*a* and the second insulating layer 110*b* in a height direction DRh.

A permittivity of the first insulating layer 110*a* and a permittivity of the second insulating layer 110*b* may be larger than a permittivity of the third insulating layer 120 disposed between the first insulating layer 110*a* and the second insulating layer 110*b*.

Thicknesses of the first insulating layer 110*a* and the second insulating layer 110*b* may be larger than a thickness of the third insulating layer 120, but are not limited thereto.

The first insulating layer 110*a* and the second insulating layer 110*b* may include a prepreg dielectric having permittivity of about 3 to 4 and a loss tangent of about 0.003 to about 0.004, but are not limited thereto.

The third insulating layer 120 may include a material that is different from materials of the first insulating layer 110*a* and the second insulating layer 110*b*. For example, the third insulating layer 120 may include a polymer having an adhesive property to increase a bonding force between the first insulating layer 110*a* and the second insulating layer 110*b*. For example, the third insulating layer 120 may include a ceramic material having a lower permittivity than the permittivities of the first insulating layer 110*a* and the second insulating layer 110*b*, or may include a material having a high flexibility such as a liquid crystal polymer (LCP) or a polyimide, or may include a material such as an epoxy resin or Teflon to have a strong durability and a high adhesion.

The via 11 includes a first portion 11*a* passing through the first insulating layer 110*a*, a second portion 11*b* passing through the second insulating layer 110*b*, and a third portion 11*c* disposed between the first portion 11*a* and the second portion 11*b* and passing through the third insulating layer 120.

The third portion 11*c* of the via 11 is connected to the first portion 11*a* and the second portion 11*b* of the via 11.

Thicknesses of the first insulating layer 110*a* and the second insulating layer 110*b* may be larger than a thickness of the third insulating layer 120, and a thickness of the first portion 11*a* of the via 11 and a thickness of the second portion 11*b* of the via 11 may be thicker than a thickness of the third portion 11*c* of the via 11. However, for ease of illustration, the thicknesses are all the same in FIG. 1A.

A third width W3 of the third portion 11*c* of the via 11 may be wider than a first width W1 of the first portion 11*a* of the via 11 and a second width W2 of the second portion 11*b* of the via 11.

The first width W1, the second width W2, and the third width W3 may be measured along a planar direction perpendicular to the height direction DRh.

According to the present embodiment, the width of the third portion 11*c* of the via 11 passing through the third insulating layer 120 having a relatively low permittivity among a plurality of insulating layers 110*a*, 110*b*, and 120 may be relatively wide. As such, by adjusting the width of the via 11 according to the position of the via 11, it is possible to adjust a path length of a current transmitted through a surface of the via 11, and due to an increased surface area of the third portion 11*c* of the via 11, a coupling size due to overlap between an antenna patch of the antenna including the via 11 and the via 11 may increase, so that the size of the coupling with the antenna patch may be adjusted as necessary.

Referring to FIG. 1B together with FIG. 1A, a planar shape of a cross-section of the first portion 11*a* and the second portion 11*b* of the via 11 according to the embodiment may be similar to a circular shape. The planar shape of the cross-section of the third portion 11*c* of the via 11 may be similar to the planar shape of the cross-section of the first portion 11*a* and the second portion 11*b* of the via 11, for example, may be similar to a circular shape.

Figure 10:
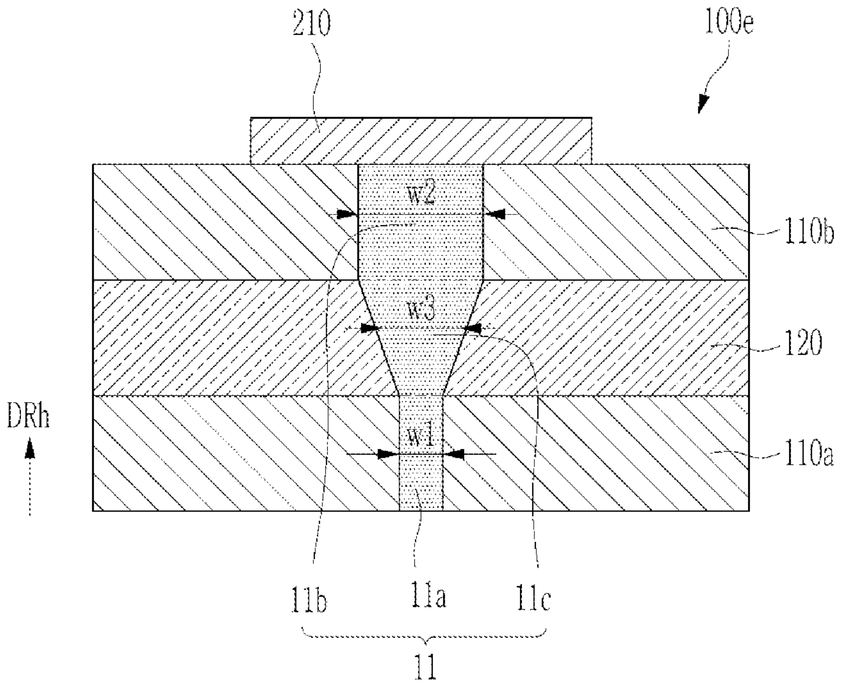
FIG. 10 illustrates a cross-sectional view of an antenna according to another embodiment.

Referring to FIG. 10 together with FIG. 1A, a planar shape of a cross-section of the first portion 11*a* and the second portion 11*b* of the via 11 according to the embodiment may be similar to a circular shape. However, the planar shape of the cross-section of the third portion 11*c* of the via 11, unlike the planar shape of the cross-section of the first portion 11*a* and the second portion 11*b* of the via 11, may have a polygonal shape, for example, may be similar to a quadrangular shape, but is not limited thereto.

Figure 2:
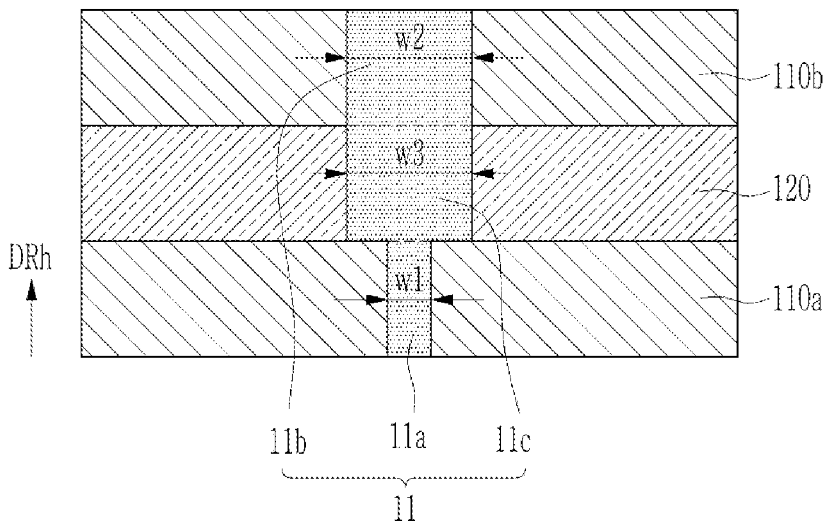
FIG. 2 illustrates a cross-sectional view of a via according to another embodiment.

A structure of a via according to another embodiment will be described with reference to FIG. 2. FIG. 2 illustrates a cross-sectional view of a via according to another embodiment.

Referring to FIG. 2, a via 11 according to the present embodiment is similar to the via 11 according to the embodiment described above with reference to FIGS. 1A to 10. A detailed description of the same constituent elements will be omitted.

The via 11 according to the present embodiment includes a first portion 11*a* passing through the first insulating layer 110*a*, a second portion 11*b* passing through the second insulating layer 110*b*, and a third portion 11*c* disposed between the first portion 11*a* and the second portion 11*b* and passing through the third insulating layer 120.

Thicknesses of the first insulating layer 110*a* and the second insulating layer 110*b* may be larger than a thickness of the third insulating layer 120, and a thickness of the first portion 11*a* of the via 11 and a thickness of the second portion 11*b* of the via 11 may be thicker than a thickness of the third portion 11*c* of the via 11. However, for ease of illustration, the thicknesses are all the same in FIG. 2.

A second width W2 of the second portion 11*b* of the via 11 and a third width W3 of the third portion 11*c* of the via 11 may be wider than a first width W1 of the first portion 11*a* of the via 11. The second width W2 of the second portion 11*b* of the via 11 and the third width W3 of the third portion 11*c* of the via 11 may be substantially the same.

According to the present embodiment, among the plurality of insulating layers 110*a*, 110*b*, and 120, the width of the third portion 11*c* of the via 11 passing through the third insulating layer 120 having a relatively low permittivity, and the width of the second portion 11*b* of the via 11 disposed on the third portion 11*c* and passing through the second insulating layer 110*b*, may be relatively wide. As such, by adjusting the width of the via 11 according to the position of the via 11, it is possible to adjust a path length of a current transmitted through a surface of the via 11, and a coupling size due to overlap between an antenna patch and the third portion 11*c* of the via 11 may be adjusted as necessary.

Figure 3:
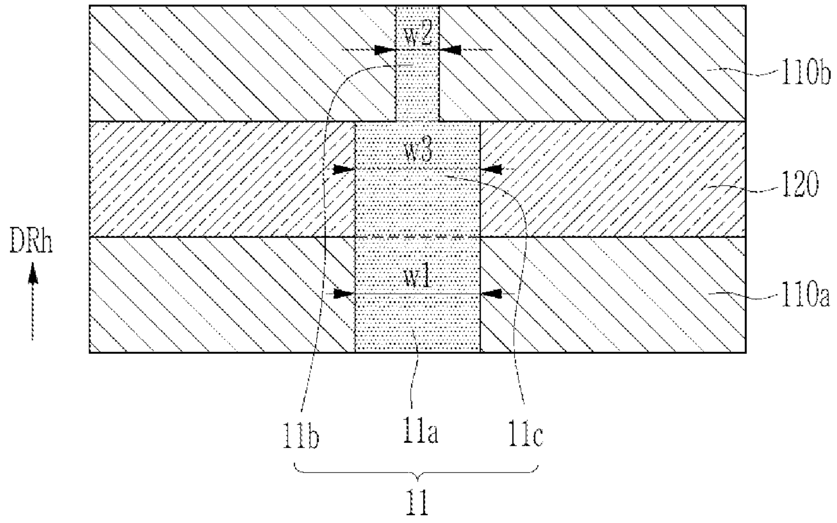
FIG. 3 illustrates a cross-sectional view of a via according to another embodiment.

A structure of a via according to another embodiment will be described with reference to FIG. 3. FIG. 3 illustrates a cross-sectional view of a via according to another embodiment.

Referring to FIG. 3, a via 11 according to the present embodiment is similar to the via 11 according to the embodiments described above with reference to FIG. 1A to FIG. 2. A detailed description of the same constituent elements will be omitted.

The via 11 according to the present embodiment includes a first portion 11*a* passing through the first insulating layer 110*a*, a second portion 11*b* passing through the second insulating layer 110*b*, and a third portion 11*c* disposed between the first portion 11*a* and the second portion 11*b* and passing through the third insulating layer 120.

Thicknesses of the first insulating layer 110*a* and the second insulating layer 110*b* may be larger than a thickness of the third insulating layer 120, and a thickness of the first portion 11*a* of the via 11 and a thickness of the second portion 11*b* of the via 11 may be thicker than a thickness of the third portion 11*c* of the via 11. However, for ease of illustration, the thicknesses are all the same in FIG. 3.

A first width W1 of the first portion 11*a* of the via 11 and a third width W3 of the third portion 11*c* of the via 11 may be wider than a second width W2 of the second portion 11*b* of the via 11. The first width W1 of the first portion 11*a* of the via 11 and the third width W3 of the third portion 11*c* of the via 11 may be substantially the same.

According to the present embodiment, among the plurality of insulating layers 110*a*, 110*b*, and 120, the width of the third portion 11*c* of the via 11 passing through the third insulating layer 120 having a relatively low permittivity, and the width of the first portion 11*a* of the via 11 disposed under the third portion 11*c* and passing through the first insulating layer 110*a*, may be relatively wide. As such, by adjusting the width of the via 11 according to the position of the via 11, it is possible to adjust a path length of a current transmitted through a surface of the via 11, and a coupling size due to overlap between an antenna patch and the third portion 11*c* of the via 11 may be adjusted as necessary.

Figure 4:
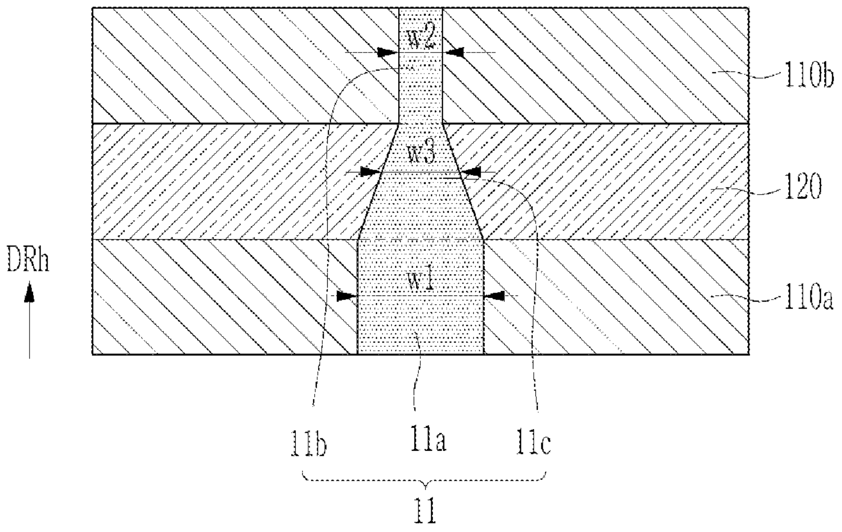
FIG. 4 illustrates a cross-sectional view of a via according to another embodiment.

A structure of a via according to another embodiment will be described with reference to FIG. 4. FIG. 4 illustrates a cross-sectional view of a via according to another embodiment.

Referring to FIG. 4, a via 11 according to the present embodiment is similar to the via 11 according to the embodiments described above with reference to FIG. 1A to FIG. 3. A detailed description of the same constituent elements will be omitted.

The via 11 according to the present embodiment includes a first portion 11*a* passing through the first insulating layer 110*a*, a second portion 11*b* passing through the second insulating layer 110*b*, and a third portion 11*c* disposed between the first portion 11*a* and the second portion 11*b* and passing through the third insulating layer 120.

Thicknesses of the first insulating layer 110*a* and the second insulating layer 110*b* may be larger than a thickness of the third insulating layer 120, and a thickness of the first portion 11*a* of the via 11 and a thickness of the second portion 11*b* of the via 11 may be thicker than a thickness of the third portion 11*c* of the via 11. However, for ease of illustration, the thicknesses are all the same in FIG. 4.

A first width W1 of the first portion 11*a* of the via 11 may be wider than a second width W2 of the second portion 11*b* of the via 11, and a width of the third portion 11*c* of the via 11 gradually becomes narrower from a portion connected to the first portion 11*a* of the via 11, and may become narrowest at a portion connected to the second portion 11*b* of the via 11. That is, the width of the third portion 11*c* of the via 11 has the same width as the first width W1 at the portion connected to the first portion 11*a*, and gradually becomes narrower as it goes away from the first portion 11*a* of the via 11, and it may have the same width as the second width W2 at the portion connected to the second portion 11*b* of the via 11.

According to the present embodiment, among the plurality of insulating layers 110*a*, 110*b*, and 120, the third portion 11*c* of the via 11 passing through the third insulating layer 120 having a relatively low permittivity may be formed to have a gradually changing width from the wide first width W1 to the narrow second width W2 in the height direction DRh. As such, by adjusting the width of the via 11 according to the position of the via 11, it is possible to adjust a path length of a current transmitted through a surface of the via 11, and a coupling size due to overlap between an antenna patch and the third portion 11*c* of the via 11 may be adjusted as necessary.

Figure 5:
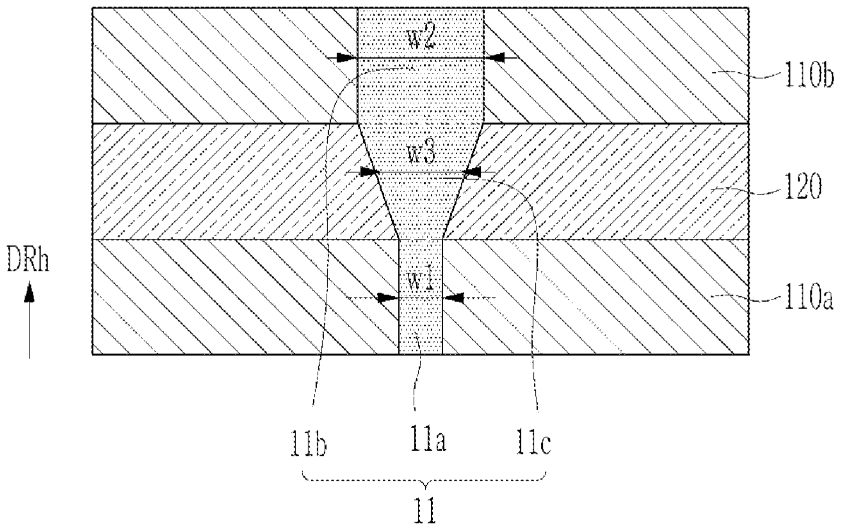
FIG. 5 illustrates a cross-sectional view of a via according to another embodiment.

A structure of a via according to another embodiment will be described with reference to FIG. 5. FIG. 5 illustrates a cross-sectional view of a via according to another embodiment.

Referring to FIG. 5, a via 11 according to the present embodiment is similar to the via 11 according to the embodiments described above with reference to FIG. 1A to FIG. 4. A detailed description of the same constituent elements will be omitted.

The via 11 according to the present embodiment includes a first portion 11*a* passing through the first insulating layer 110*a*, a second portion 11*b* passing through the second insulating layer 110*b*, and a third portion 11*c* disposed between the first portion 11*a* and the second portion 11*b* and passing through the third insulating layer 120.

Thicknesses of the first insulating layer 110*a* and the second insulating layer 110*b* may be larger than a thickness of the third insulating layer 120, and a thickness of the first portion 11*a* of the via 11 and a thickness of the second portion 11*b* of the via 11 may be thicker than a thickness of the third portion 11*c* of the via 11. However, for ease of illustration, the thicknesses are all the same in FIG. 5.

A second width W2 of the second portion 11*b* of the via 11 may be wider than a first width W1 of the first portion 11*a* of the via 11, and a width of the third portion 11*c* of the via 11 gradually becomes wider from a portion connected to the first portion 11*a* of the via 11, and may become widest at a portion connected to the second portion 11*b* of the via 11. That is, the width of the third portion 11*c* of the via 11 has the same width as the first width W1 at the portion connected to the first portion 11*a*, and gradually becomes wider as it goes away from the first portion 11*a* of the via 11, and it may have the same width as the second width W2 at the portion connected to the second portion 11*b* of the via 11.

According to the present embodiment, among the plurality of insulating layers 110*a*, 110*b*, and 120, the third portion 11*c* of the via 11 passing through the third insulating layer 120 having a relatively low permittivity may be formed to have a gradually changing width from the wide first width W1 to the narrow second width W2 in the height direction DRh. As such, by adjusting the width of the via 11 according to the position of the via 11, it is possible to adjust a path length of a current transmitted through a surface of the via 11, and a coupling size due to overlap between an antenna patch and the third portion 11*c* of the via 11 may be adjusted as necessary.

Figure 6A:
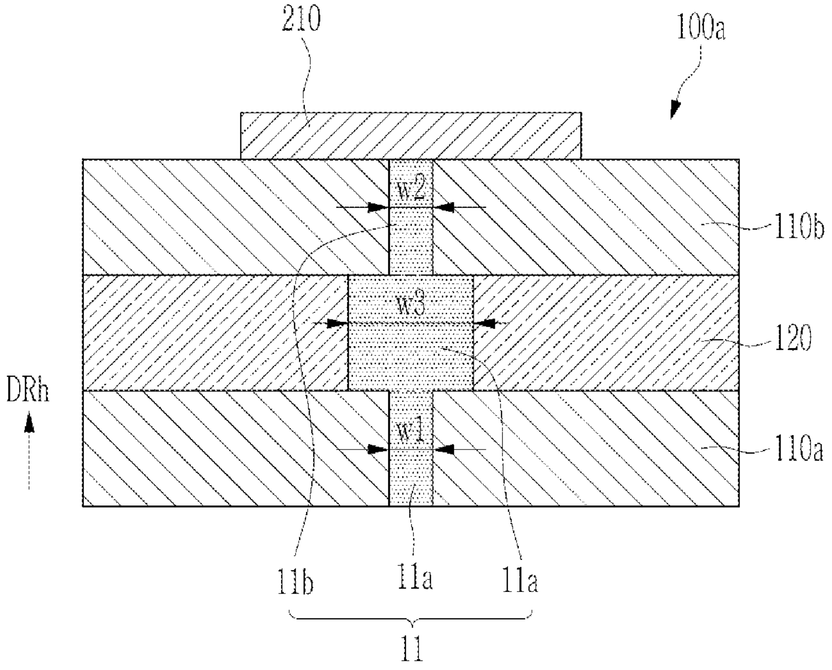
FIG. 6A illustrates a cross-sectional view of an antenna according to an embodiment.

Hereinafter, an antenna according to an embodiment will be described with reference to FIG. 6A. FIG. 6A illustrates a cross-sectional view of an antenna according to an embodiment.

Referring to FIG. 6A, an antenna 100*a* according to the present embodiment includes a plurality of insulating layers 110*a*, 110*b*, and 120, a feed via 11 passing through the plurality of insulating layers 110*a*, 110*b*, and 120, and an antenna patch 210 connected to the feed via 11.

The plurality of insulating layers 110*a*, 110*b*, and 120 include a first insulating layer 110*a*, a second insulating layer 110*b* disposed on the first insulating layer 110*a* in the height direction DRh, and a third insulating layer 120 disposed between the first insulating layer 110*a* and the second insulating layer 110*b*.

A permittivity of the first insulating layer 110*a* and a permittivity of the second insulating layer 110*b* may be larger than a permittivity of the third insulating layer 120, and thicknesses of the first insulating layer 110*a* and the second insulating layer 110*b* may be larger than a thickness of the third insulating layer 120, but the disclosure is not limited thereto. However, for ease of illustration, the thicknesses are all the same in FIG. 6A.

The first insulating layer 110*a* and the second insulating layer 110*b* may include a prepreg dielectric having a permittivity of about 3 to 4 and a loss tangent of about 0.003 to about 0.004, but are not limited thereto.

The third insulating layer 120 may include a material that is different from materials of the first insulating layer 110*a* and the second insulating layer 110*b*. For example, the third insulating layer 120 may include a polymer having an adhesive property to increase a bonding force between the first insulating layer 110*a* and the second insulating layer 110*b*. For example, the third insulating layer 120 may include a ceramic material having a lower permittivity than permittivities of the first insulating layer 110*a* and the second insulating layer 110*b*, or may include a material having a high flexibility such as a liquid crystal polymer (LCP) or a polyimide, or may include a material such as an epoxy resin or Teflon to have a strong durability and a high adhesion.

The feed via 11 includes a first portion 11*a* passing through the first insulating layer 110*a*, a second portion 11*b* passing through the second insulating layer 110*b*, and a third portion 11*c* disposed between the first portion 11*a* and the second portion 11*b* and passing through the third insulating layer 120.

A third width W3 of the third portion 11*c* of the feed via 11 may be wider than a first width W1 of the first portion 11*a* of the feed via 11 and a second width W2 of the second portion 11*b* of the feed via 11.

The antenna patch 210 may be disposed on the second insulating layer 110*b*, and may be connected to the feed via 11.

The antenna patch 210 may transmit/receive an RF signal through an electromagnetic signal transmitted through the feed via 11.

The width of the feed via 11 is not constant, so the width of the third portion 11*c* of the feed via 11 passing through the third insulating layer 120 having a relatively low permittivity among the plurality of insulating layers 110*a*, 110*b*, and 120 may be relatively wide.

Since the feed via 11 includes the third portion 11*c* having the relatively wide width, a path length of a current flowing along a surface of the feed via 11 may be longer than when the third portion 11*c* is not included. As such, as the path length of the current flowing along the surface of the feed via 11 is increased, a bandwidth of the antenna 100*a* may be widened without increasing a size of the antenna patch 210.

In addition, the antenna patch 210 may form an additional coupling with the third portion 11*c* of the feed via 11 having the relatively wide width, and through this, the bandwidth of the antenna 100*a* may be increased without forming a separate coupling pattern.

As such, in the antenna 100*a* according to the embodiment, by adjusting the width of the third portion 11*c* of the feed via 11 that transmits the electromagnetic signal to the antenna patch 210, the bandwidth of the antenna 100*a* may increase without forming a separate coupling pattern.

Figure 6B:
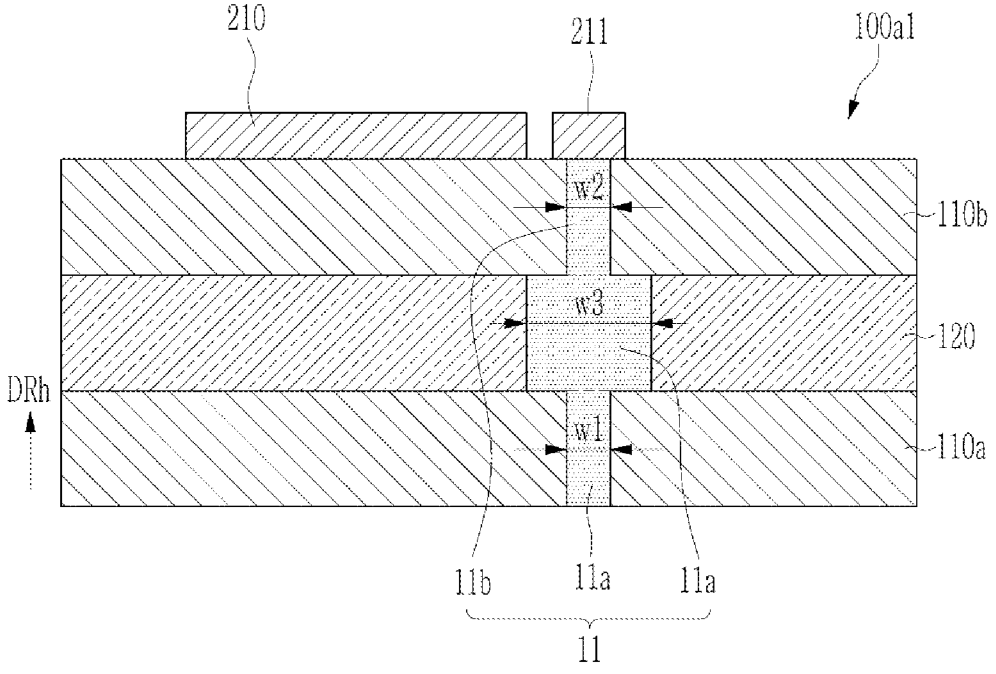
FIG. 6B illustrates a cross-sectional view of an antenna according to another embodiment.

An antenna 100*a*1 according to another embodiment will be described with reference to FIG. 6B. FIG. 6B illustrates a cross-sectional view of an antenna according to another embodiment.

Referring to FIG. 6B, the antenna 100*a*1 according to the present embodiment is similar to the antenna 100*a* according to the embodiment described above. A detailed description of the same constituent elements will be omitted.

The antenna 100*a*1 according to the present embodiment may include a plurality of insulating layers 110*a*, 110*b*, and 120, a feed via 11 passing through the plurality of insulating layers 110*a*, 110*b*, and 120, a feed pattern 211 connected to the feed via 11, and an antenna patch 210 coupled to the feed pattern 211.

The feed via 11 includes a first portion 11*a* passing through the first insulating layer 110*a*, a second portion 11*b* passing through the second insulating layer 110*b*, and a third portion 11*c* disposed between the first portion 11*a* and the second portion 11*b* and passing through the third insulating layer 120.

A third width W3 of the third portion 11*c* of the feed via 11 may be wider than a first width W1 of the first portion 11*a* of the feed via 11 and a second width W2 of the second portion 11*b* of the feed via 11. The first width W1 of the first portion 11a of the feed via 11 and the second width W2 of the second portion 11b of the feed via 11 may be substantially the same.

The feed pattern 211 and the antenna patch 210 may be disposed on the second insulating layer 110b, the feed pattern 211 may be connected to the feed via 11, and the antenna patch 210 may be capacitively coupled to the feed via 11 through the feed pattern 211 without being directly connected thereto.

The antenna patch 210 may transmit/receive an RF signal through an electromagnetic signal transmitted through the feed via 11 and the feed pattern 211.

The width of the feed via 11 is not constant, so the width of the third portion 11c of the feed via 11 passing through the third insulating layer 120 having a relatively low permittivity among the plurality of insulating layers 110a, 110b, and 120 may be relatively wide.

By including the third portion 11c of the feed via 11 having a relatively wide width, the current path of the surface current flowing along the surface of the feed via 11 may be increased, thereby increasing the bandwidth of the antenna 100a1. In addition, the antenna patch 210 may form an additional coupling with the third portion 11c of the feed via 11, and through this, the bandwidth of the antenna 100a1 may increase without forming a separate coupling pattern.

As such, in the antenna 100a1 according to the embodiment, by adjusting the width of the feed via 11 that transmits the electromagnetic signal to the antenna patch 210, the bandwidth of the antenna 100a1 may increase without forming a separate coupling pattern.

Figure 7:
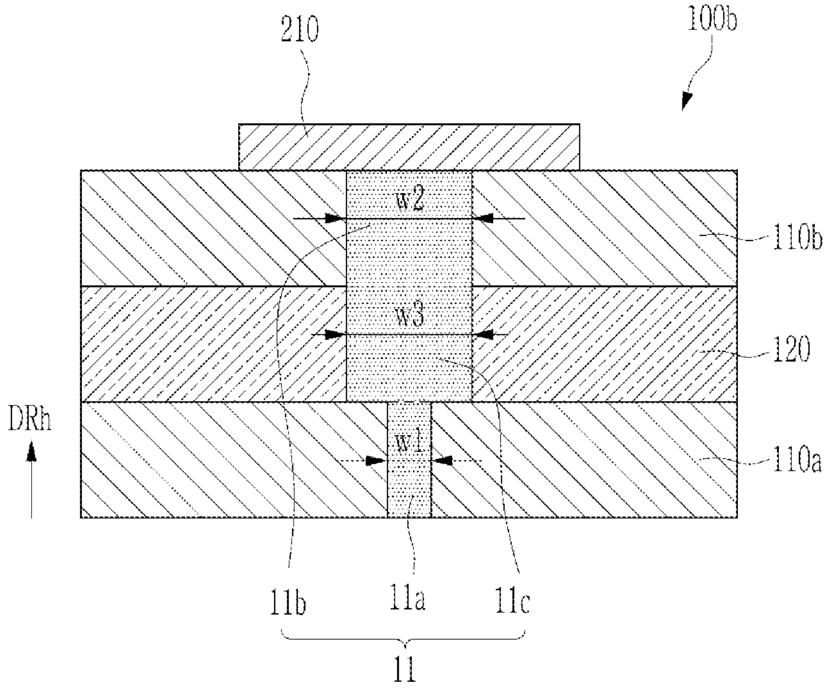
FIG. 7 illustrates a cross-sectional view of an antenna according to another embodiment.

A structure of an antenna 100b according to another embodiment will be described with reference to FIG. 7. FIG. 7 illustrates a cross-sectional view of an antenna according to another embodiment.

Referring to FIG. 7, the antenna 100b according to the present embodiment is similar to the antennas 100a and 100a1 according to the embodiments described above. A detailed description of the same constituent elements will be omitted.

The antenna 100b according to the present embodiment includes a plurality of insulating layers 110a, 110b, and 120, a feed via 11 passing through the plurality of insulating layers 110a, 110b, and 120, and an antenna patch 210 connected to the feed via 11.

The feed via 11 includes a first portion 11a passing through the first insulating layer 110a, a second portion 11b passing through the second insulating layer 110b, and a third portion 11c disposed between the first portion 11a and the second portion 11b and passing through the third insulating layer 120.

The second width W2 of the second portion 11b of the feed via 11 and the third width W3 of the third portion 11c of the feed via 11 may be larger than the first width W1 of the first portion 11a of the feed via 11. The second width W2 of the second portion 11b of the feed via 11 and the third width W3 of the third portion 11c of the feed via 11 may be substantially the same.

The antenna patch 210 may be disposed on the second insulating layer 110b, and may be connected to the feed via 11. However, the disclosure is not limited thereto, and similarly to the antenna 100a1 according to the embodiment described with reference to FIG. 6B, the antenna patch 210 may be capacitively coupled to the feed via 11 through a feed pattern 211 without being directly connected to the feed via 11.

The antenna patch 210 may transmit/receive an RF signal through an electromagnetic signal transmitted through the feed via 11.

The width of the feed via 11 is not constant, and among the plurality of insulating layers 110a, 110b, and 120, the width of the third portion 11c of the feed via 11 passing through the third insulating layer 120 having a relatively low permittivity, and the width of the second portion 11b of the feed via 11 disposed on the third portion 11c and passing through the second insulating layer 110b, may be relatively wide.

By forming the width of the third portion 11c and the width of the second portion 11b of the feed via 11 to be relatively wide, the path length of the current flowing along the surface of the feed via 11 may be increased, thereby increasing the bandwidth of the antenna 100b. In addition, the antenna patch 210 may form an additional coupling with the third portion 11c and the second portion 11b of the feed via 11 having the relatively wide width, and through this, the bandwidth of the antenna 100b may increase without forming a separate coupling pattern.

As such, in the antenna 100b according to the embodiment, by adjusting the width of the feed via 11 that transmits the electromagnetic signal to the antenna patch 210, the bandwidth of the antenna 100b may increase without forming a separate coupling pattern.

Figure 8:
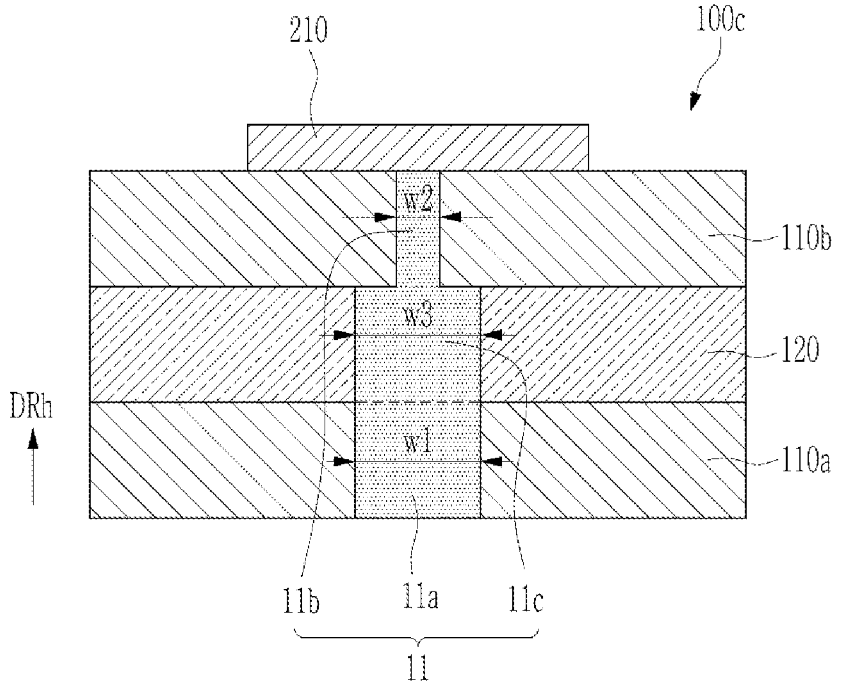
FIG. 8 illustrates a cross-sectional view of an antenna according to another embodiment.

A structure of an antenna 100c according to another embodiment will be described with reference to FIG. 8. FIG. 8 illustrates a cross-sectional view of an antenna according to another embodiment.

Referring to FIG. 8, the antenna 100c according to the present embodiment is similar to the antennas 100a, 100a1, and 100b according to the embodiments described above. A detailed description of the same constituent elements will be omitted.

The antenna 100c according to the present embodiment includes a plurality of insulating layers 110a, 110b, and 120, a feed via 11 passing through the plurality of insulating layers 110a, 110b, and 120, and an antenna patch 210 connected to the feed via 11.

The feed via 11 includes a first portion 11a passing through the first insulating layer 110a, a second portion 11b passing through the second insulating layer 110b, and a third portion 11c disposed between the first portion 11a and the second portion 11b and passing through the third insulating layer 120.

A first width W1 of the first portion 11a of the feed via 11 and a third width W3 of the third portion 11c of the feed via 11 may be wider than a second width W2 of the second portion 11b of the feed via 11. The first width W1 of the first portion 11a of the feed via 11 and the third width W3 of the third portion 11c of the feed via 11 may be substantially the same.

The antenna patch 210 may be disposed on the second insulating layer 110b, and may be connected to the feed via 11. However, the disclosure is not limited thereto, and similarly to the antenna 100a1 according to the embodiment described with reference to FIG. 6B, the antenna patch 210 may be capacitively coupled to the feed via 11 through a feed pattern 211 without being directly connected to the feed via 11.

The antenna patch 210 may transmit/receive an RF signal through an electromagnetic signal transmitted through the feed via 11.

The width of the feed via 11 is not constant, and among the plurality of insulating layers 110a, 110b, and 120, the width of the third portion 11c of the feed via 11 passing through the third insulating layer 120 having a relatively low permittivity, and the width of the first portion 11*a* of the feed via 11 disposed under the third portion 11*c* and passing through the first insulating layer 110*a*, may be relatively wide.

By forming the width of the third portion 11*c* and the width of the first portion 11*a* of the feed via 11 to be relatively wide, the path length of the current flowing along the surface of the feed via 11 may be increased, thereby increasing the bandwidth of the antenna 100*c*. In addition, the antenna patch 210 may form an additional coupling with the third portion 11*c* and the first portion 11*a* of the feed via 11 having the relatively wide width, and through this, the bandwidth of the antenna 100*c* may increase without forming a separate coupling pattern.

As such, in the antenna 100*c* according to the embodiment, by adjusting the width of the feed via 11 that transmits the electromagnetic signal to the antenna patch 210, the bandwidth of the antenna 100*c* may increase without forming a separate coupling pattern.

Figure 9:
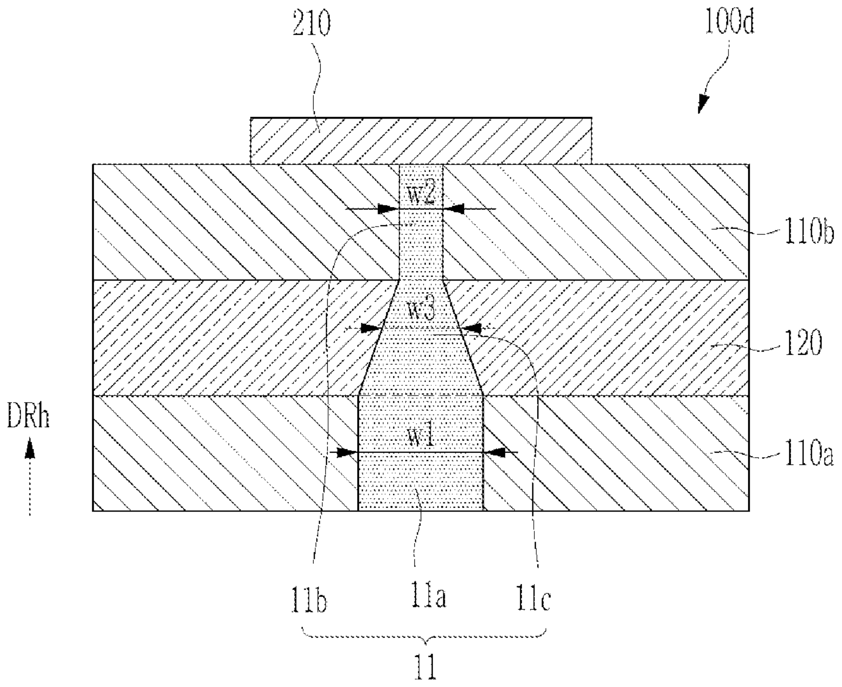
FIG. 9 illustrates a cross-sectional view of an antenna according to another embodiment.

A structure of an antenna 100*d* according to another embodiment will be described with reference to FIG. 9. FIG. 9 illustrates a cross-sectional view of an antenna according to another embodiment.

Referring to FIG. 9, the antenna 100*d* according to the present embodiment is similar to the antennas 100*a*, 100*a*1, 100*b*, and 100*c* according to the embodiments described above. A detailed description of the same constituent elements will be omitted.

The antenna 100*d* according to the present embodiment includes a plurality of insulating layers 110*a*, 110*b*, and 120, a feed via 11 passing through the plurality of insulating layers 110*a*, 110*b*, and 120, and an antenna patch 210 connected to the feed via 11.

The feed via 11 includes a first portion 11*a* passing through the first insulating layer 110*a*, a second portion 11*b* passing through the second insulating layer 110*b*, and a third portion 11*c* disposed between the first portion 11*a* and the second portion 11*b* and passing through the third insulating layer 120.

A first width W1 of the first portion 11*a* of the feed via 11 may be wider than a second width W2 of the second portion 11*b* of the feed via 11, and a width of the third portion 11*c* of the feed via 11 gradually becomes narrower from a portion connected to the first portion 11*a* of the feed via 11, and may become narrowest at a portion connected to the second portion 11*b* of the feed via 11. That is, the width of the third portion 11*c* of the feed via 11 has the same width as the first width W1 at the portion connected to the first portion 11*a*, and gradually becomes narrower as it goes away from the first portion 11*a* of the feed via 11, and it may have the same width as the second width W2 at the portion connected to the second portion 11*b* of the feed via 11.

The antenna patch 210 may be disposed on the second insulating layer 110*b*, and may be connected to the feed via 11. However, the disclosure is not limited thereto, and similarly to the antenna 100*a*1 according to the embodiment described with reference to FIG. 6B, the antenna patch 210 may be capacitively coupled to the feed via 11 through a feed pattern 211 without being directly connected to the feed via 11.

The antenna patch 210 may transmit/receive an RF signal through an electromagnetic signal transmitted through the feed via 11.

The width of the feed via 11 is not constant, and among the plurality of insulating layers 110*a*, 110*b*, and 120, the third portion 11*c* of the feed via 11 passing through the third insulating layer 120 having a relatively low permittivity may have a gradually changing width from the wide first width W1 to the narrow second width W2 in the height direction DRh.

By forming the width of the first portion 11*a* of the feed via 11 to be relatively wide and by forming the width of the third portion 11*c* to be gradually widened toward the first portion 11*a*, the path length of the current flowing along the surface of the feed via 11 may be increased, thereby increasing the bandwidth of the antenna 100*d*. In addition, the antenna patch 210 may form an additional coupling with the third portion 11*c* and the first portion 11*a* of the feed via 11 having the relatively wide width, and through this, the bandwidth of the antenna 100*d* may be increased without forming a separate coupling pattern.

As such, in the antenna 100*d* according to the embodiment, by adjusting the width of the feed via 11 that transmits the electromagnetic signal to the antenna patch 210, the bandwidth of the antenna 100*d* may increase without forming a separate coupling pattern.

A structure of an antenna 100*e* according to another embodiment will be described with reference to FIG. 10. FIG. 10 illustrates a cross-sectional view of an antenna 100*e* according to another embodiment.

Referring to FIG. 10, the antenna 100*e* according to the present embodiment is similar to the antennas 100*a*, 100*a*1, 100*b*, 100*c*, and 100*d* according to the embodiments described above. A detailed description of the same constituent elements will be omitted.

The antenna 100*e* according to the present embodiment includes a plurality of insulating layers 110*a*, 110*b*, and 120, a feed via 11 passing through the plurality of insulating layers 110*a*, 110*b*, and 120, and an antenna patch 210 connected to the feed via 11.

The feed via 11 includes a first portion 11*a* passing through the first insulating layer 110*a*, a second portion 11*b* passing through the second insulating layer 110*b*, and a third portion 11*c* disposed between the first portion 11*a* and the second portion 11*b* and passing through the third insulating layer 120.

A second width W2 of the second portion 11*b* of the feed via 11 may be wider than a first width W1 of the first portion 11*a* of the feed via 11, and a width of the third portion 11*c* of the feed via 11 gradually becomes wider from a portion connected to the first portion 11*a* of the feed via 11, and may become widest at a portion connected to the second portion 11*b* of the feed via 11. That is, the width of the third portion 11*c* of the feed via 11 has the same width as the first width W1 at the portion connected to the first portion 11*a*, and gradually becomes wider as it goes away from the first portion 11*a* of the feed via 11, and it may have the same width as the second width W2 at the portion connected to the second portion 11*b* of the feed via 11.

The antenna patch 210 may be disposed on the second insulating layer 110*b*, and may be connected to the feed via 11. However, the disclosure is not limited thereto, and similarly to the antenna according to the embodiment described with reference to FIG. 6B, the antenna patch 210 may be capacitively coupled to the feed via 11 through an antenna patch 211 without being directly connected to the feed via 11.

The antenna patch 210 may transmit/receive an RF signal through an electromagnetic signal transmitted through the feed via 11.

The width of the feed via 11 is not constant, and among the plurality of insulating layers 110*a*, 110*b*, and 120, the third portion 11*c* of the feed via 11 passing through the third insulating layer 120 having a relatively low permittivity may have a gradually changing width from the wide first width W1 to the narrow second width W2 in the height direction DRh.

By forming the width of the second portion 11*b* of the feed via 11 to be relatively wide and by forming the width of the third portion 11*c* to be gradually widened according to the height thereof, the path length of the current flowing along the surface of the feed via 11 may be increased, thereby increasing the bandwidth of the antenna 100*e*. In addition, the antenna patch 210 may form an additional coupling with the third portion 11*c* and the second portion 11*b* of the feed via 11 having the relatively wide width, and through this, the bandwidth of the antenna 100*e* may be increased without forming a separate coupling pattern.

As such, in the antenna 100*e* according to the embodiment, by adjusting the width of the feed via 11 that transmits the electromagnetic signal to the antenna patch 210, the bandwidth of the antenna 100*d* may increase without forming a separate coupling pattern.

Figure 11A:
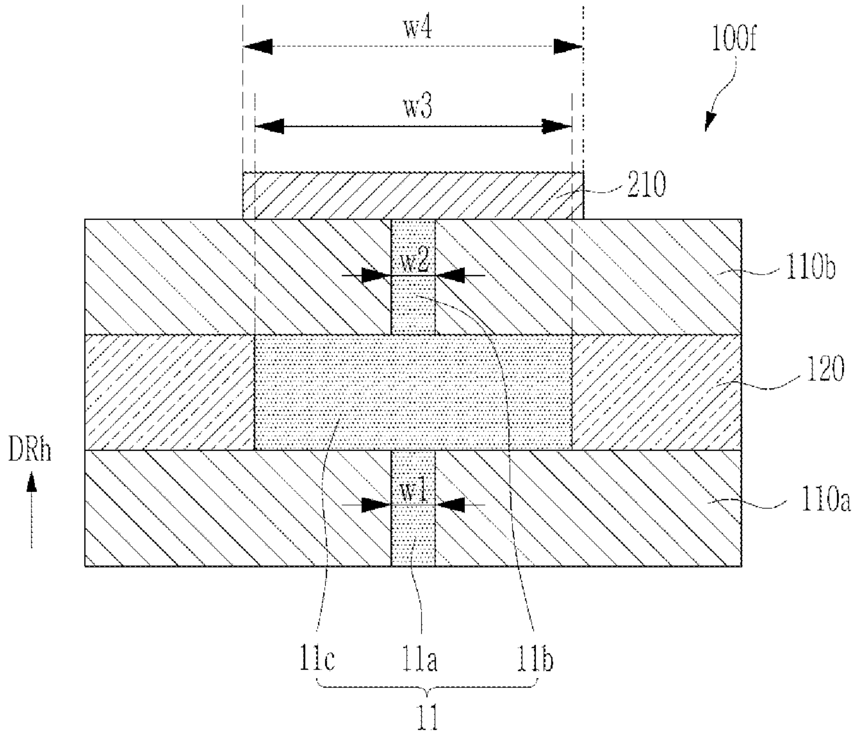
FIG. 11A illustrates a cross-sectional view of an antenna according to another embodiment.
Figure 11B:
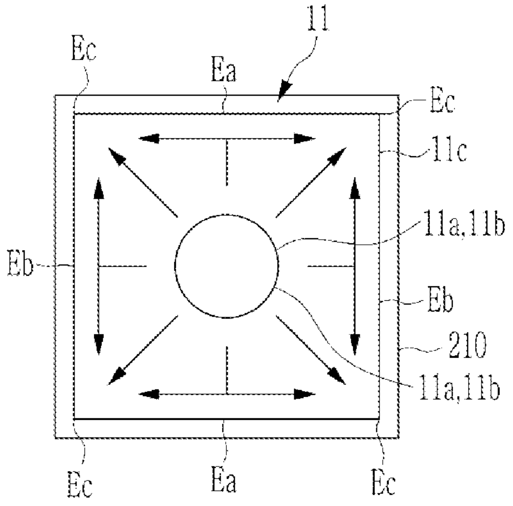
FIG. 11B illustrates a top plan view of a portion of the antenna of FIG. 11A.

An antenna 100*f* according to another embodiment will be described with reference to FIG. 11A and FIG. 11B. FIG. 11A illustrates a cross-sectional view of an antenna according to another embodiment, and FIG. 11B illustrates a top plan view of a portion of the antenna of FIG. 11A.

Referring to FIG. 11A, the antenna 100*f* according to the present embodiment is similar to the antenna 100*a* according to the embodiment described above with respect to FIG. 6A. A detailed description of the same constituent elements will be omitted.

The antenna 100*f* according to the present embodiment includes a plurality of insulating layers 110*a*, 110*b*, and 120, a feed via 11 passing through the plurality of insulating layers 110*a*, 110*b*, and 120, and an antenna patch 210 connected to the feed via 11.

The feed via 11 includes a first portion 11*a* passing through the first insulating layer 110*a*, a second portion 11*b* passing through the second insulating layer 110*b*, and a third portion 11*c* disposed between the first portion 11*a* and the second portion 11*b* and passing through the third insulating layer 120.

The antenna patch 210 may be disposed on the second insulating layer 110*b*, and may be connected to the via 11. However, the disclosure is not limited thereto, and similarly to the antenna according to the embodiment described with reference to FIG. 6B, the antenna patch 210 may be capacitively coupled to the feed via 11 through an antenna patch 211 without being directly connected to the feed via 11.

A third width W3 of the third portion 11*c* of the via 11 may be wider than a first width W1 of the first portion 11*a* of the via 11 and a second width W2 of the second portion 11*b* of the via 11.

The third width W3 of the third portion 11*c* of the via 11 may be substantially the same as a fourth width W4 of the antenna patch 210, but may be smaller than the fourth width W4 of the antenna patch 210.

The antenna patch 210 may transmit/receive an RF signal through an electromagnetic signal transmitted through the via 11.

Referring to FIG. 11B, a planar shape of the third portion 11*c* of the feed via 11 of the antenna 100*f* according to the present embodiment, unlike planar shapes of the first portion 11*a* and the second portion 11*b* of the feed via 11, may have a polygonal shape, and for example, may have a quadrangular planar shape. The planar shape of the third portion 11*c* of the feed via 11 may be substantially the same as that of the antenna patch 210.

As such, when the planar shape of the third portion 11*c* of the feed via 11 has the polygonal shape, the surface current flowing through the third portion 11*c* of the feed via 11 does not radially flow, and as indicated by arrows in FIG. 11B, it flows along first edges Ea and second edges Eb extending in different directions and then flows toward corner portions Ec formed by the first edges Ea and the second edges Eb intersecting each other. Accordingly, the surface current flowing along the surface of the third portion 11*c* of the feed via 11 has a direction toward the corner portions Ec.

As such, the width of the via 11 is not constant, and among the plurality of insulating layers 110*a*, 110*b*, and 120, the width of the third portion 11*c* of the via 11 passing through the third insulating layer 120 having a relatively low permittivity may be relatively wide, and since the surface current flowing through the surface of the third portion 11*c* of the via 11 having the relatively wide width has the same direction as the surface current flowing through the surface of the antenna patch 210, the third portion 11*c* of the via 11 may serve as an additional antenna patch.

The antenna patch 210 may be additionally coupled to the third portion 11*c* of the via 11 having the relatively wide width, and the third portion 11*c* of the via 11 may serve as an additional antenna patch. Through this, the bandwidth of the antenna 100*a* may be increased without forming a separate antenna patch or coupling pattern.

As such, in the antenna 100*f* according to the embodiment, by adjusting the width of the third portion 11*c* of the via 11 that transmits the electromagnetic signal to the antenna patch 210, the bandwidth of the antenna 100*f* may increase without forming a separate coupling pattern.

Figure 12:
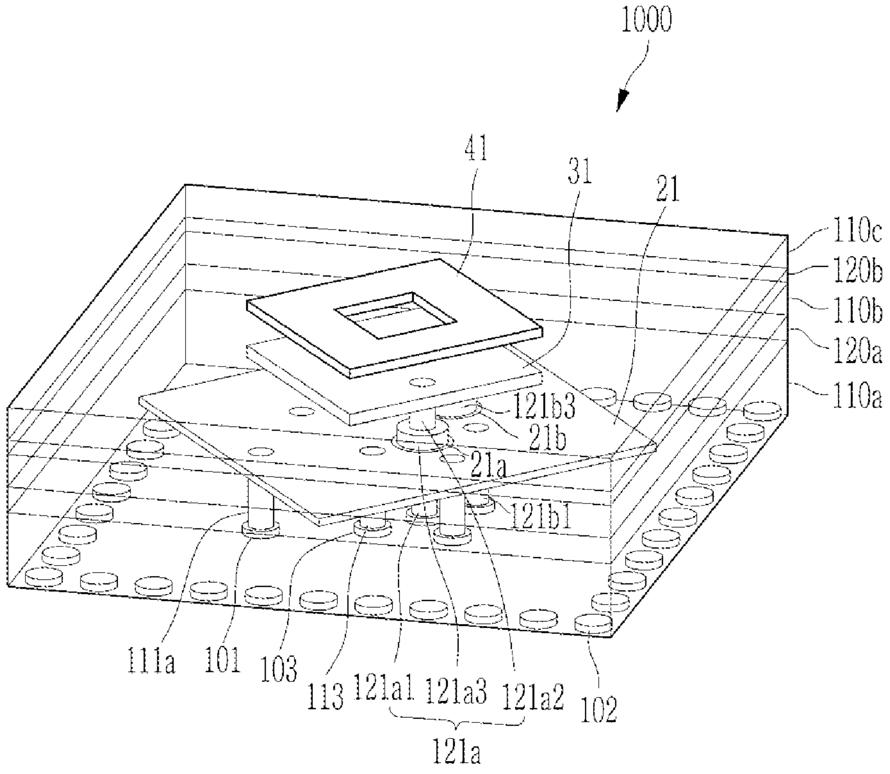
FIG. 12 illustrates a perspective view of a portion of an antenna according to another embodiment.

Hereinafter, an antenna apparatus 1000 according to an embodiment will be described with reference to FIG. 12 and FIG. 13. FIG. 12 illustrates a perspective view of a portion of an antenna according to another embodiment, and FIG. 13 illustrates a cross-sectional view of an antenna according to another embodiment.

Figure 13:
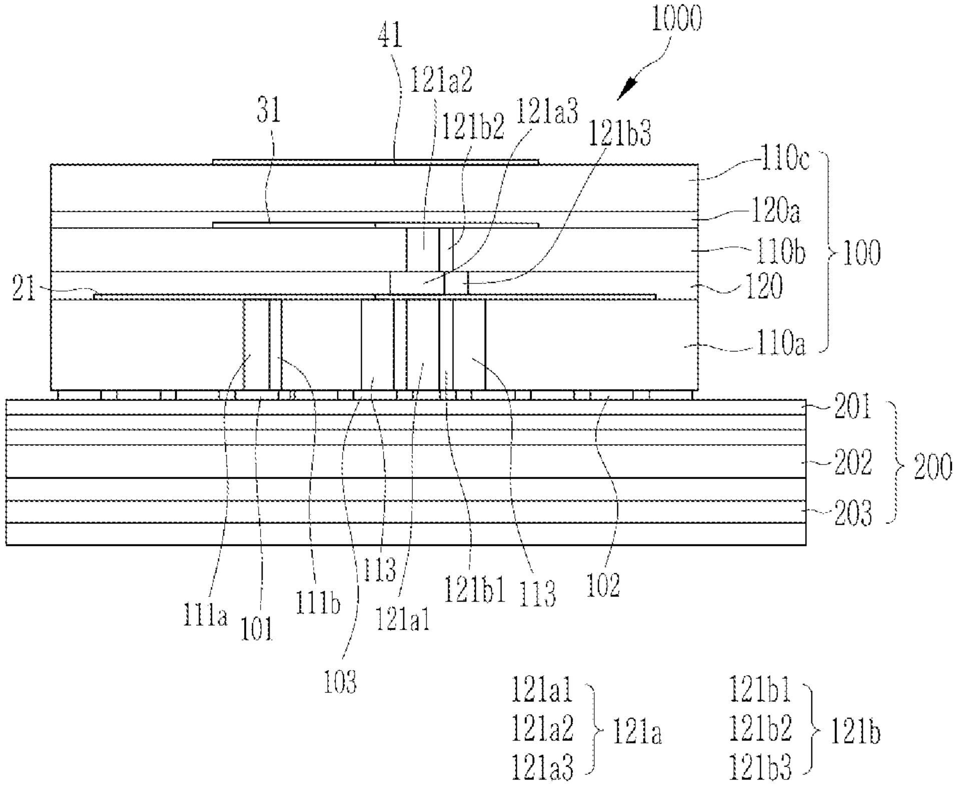
FIG. 13 illustrates a cross-sectional view of an antenna according to another embodiment.

Referring to FIG. 12 and FIG. 13, an antenna device 1000 according to the present embodiment may include an antenna part 100 and a connecting substrate 200 connected to the antenna part 100.

The antenna part 100 may include a plurality of insulating layers 110*a*, 110*b*, 110*c*, 120, and 120*a*, a plurality of feed vias 111*a*, 111*b*, 121*a*, and 121*b*, a plurality of ground vias 113, a first antenna patch 21, a second antenna patch 31, and a third antenna patch 41.

The connecting substrate 200 may include a ground plane 201, and metal layers 202 and 203.

The plurality of insulating layers 110*a*, 110*b*, 110*c*, 120, and 120*a* may include a first insulating layer 110*a*, a second insulating layer 110*b* disposed on the first insulating layer 110*a*, a third insulating layer 120 disposed between the first insulating layer 110*a* and the second insulating layer 110*b*, a fourth insulating layer 110*c* disposed on the second insulating layer 110*b*, and a fifth insulating layer 120*a* disposed between the second insulating layer 110*b* and the fourth insulating layer 110*c*.

A permittivity of the first insulating layer 110*a* and a permittivity of the second insulating layer 110*b* may be larger than a permittivity of the third insulating layer 120, and the permittivity of the second insulating layer 110*b* and a permittivity of the fourth insulating layer 110*c* may be larger than a permittivity of the fifth insulating layer 120*a*.

Thicknesses of the first insulating layer 110*a* and the second insulating layer 110*b* may be larger than a thickness of the third insulating layer 120, and the thickness of the second insulating layer 110*b* and a thickness of the fourth insulating layer 110*c* may be larger than a thickness of the fifth insulating layer 120*a*, but the disclosure is not limited thereto.

The first insulating layer 110*a*, the second insulating layer 110*b*, and the fourth insulating layer 110*c* may include a prepreg dielectric having a permittivity of about 3 to 4 and a loss tangent of about 0.003 to about 0.004, but are not limited thereto.

The third insulating layer 120 and the fifth insulating layer 120*a* may include a material that is different from materials of the first insulating layer 110*a*, the second insulating layer 110*b*, and the fourth insulating layer 110*c*. For example, the third insulating layer 120 and the fifth insulating layer 120*a* may include a polymer having an adhesive property so as to increase a bonding force between the first insulating layer 110*a* and the second insulating layer 110*b*, and a bonding force between the second insulating layer 110*b* and the fourth insulating layer 110*c*. For example, the third insulating layer 120 and the fifth insulating layer 120*a* may include a ceramic material having a lower permittivity than permittivities of the first insulating layer 110*a*, the second insulating layer 110*b*, and the fourth insulating layer 110*c*, or may include a material having a high flexibility such as a liquid crystal polymer (LCP) or a polyimide, or may include a material such as an epoxy resin or Teflon to have a strong durability and a high adhesion.

The plurality of feed vias 111*a*, 111*b*, 121*a*, and 121*b* may include a first feed via 111*a*, a second feed via 111*b*, a third feed via 121*a*, and a fourth feed via 121*b*.

The first feed via 111*a* and the second feed via 111*b* may pass through the first insulating layer 110*a* to be connected to the first antenna patch 21 disposed on the first insulating layer 110*a*, and the first antenna patch 21 may receive electromagnetic signals through the first feed via 111*a* and the second feed via 111*b*.

The third feed via 121*a* and the fourth feed via 121*b* may pass through the first insulating layer 110*a*, the third insulating layer 120, and the second insulating layer 110*b* to be connected to the second antenna patch 31 disposed on the second insulating layer 110*b*, and the second antenna patch 31 may receive electromagnetic signals through the third feed via 121*a* and the fourth feed via 121*b*.

The first antenna patch 21 includes a first hole 21*a* and a second hole 21*b*, and the third feed via 121*a* and the fourth feed via 121*b* may pass through the first antenna patch 21 by passing through the first hole 21*a* and the second hole 21*b*.

The third feed via 121*a* may include a first portion 121*a*1 passing through the first insulating layer 110*a*, a second portion 121*a*2 passing through the second insulating layer 110*b*, and a third portion 121*a*3 passing through the third insulating layer 120, and a width of the third portion 121*a*3 of the third feed via 121*a* may be wider than a width of the first portion 121*a*1 of the third feed via 121*a* and a width of the second portion 121*a*2 of the third feed via 121*a*.

Similarly, the fourth feed via 121*b* may include a first portion 121*b*1 passing through the first insulating layer 110*a*, a second portion 121*b*2 passing through the second insulating layer 110*b*, and a third portion 121*b*3 passing through the third insulating layer 120, and a width of the third portion 121*b*3 of the fourth feed via 121*b* may be wider than a width of the first portion 121*b*1 of the fourth feed via 121*b* and a width of the second portion 121*b*2 of the fourth feed via 121*b*.

The first antenna patch 21 of the antenna apparatus 1000 may transmit and receive an RF signal of a first bandwidth through the first feed via 111*a* and the second feed via 111*b*, and the second antenna patch 31 and the third antenna patch 41 of the antenna apparatus 1000 may transmit and receive an RF signal of a second bandwidth different from the first bandwidth through the third feed via 121*a* and the fourth feed via 121*b*. A center frequency of the first bandwidth may be lower than a center frequency of the second bandwidth. For example, the center frequency of the first bandwidth may be about 24 GHz or about 28 GHz, and the center frequency of the second bandwidth may be about 39 GHz.

The first feed via 111*a* and the second feed via 111*b* may transmit electromagnetic signals having different polarization characteristics, and surface currents flowing through the first antenna patch 21 in response to the electromagnetic signals of the first feed via 111*a* and the second feed via 111*b* may be perpendicular to each other. Accordingly, the antenna apparatus 1000 may transmit and receive an RF signal of a first bandwidth having different polarization characteristics.

Similarly, the third feed via 121*a* and the fourth feed via 121*b* may transmit electromagnetic signals having different polarization characteristics, and surface currents flowing through the second antenna patch 31 in response to electromagnetic signals of the third feed via 121*a* and the fourth feed via 121*b* may be perpendicular to each other. Accordingly, the antenna apparatus 1000 may transmit and receive an RF signal of a second bandwidth having different polarization characteristics.

The widths of the third feed via 121*a* and the fourth feed via 121*b* are not constant, and among the plurality of insulating layers 110*a*, 110*b*, and 120 through which the third feed via 121*a* and the fourth feed via 121*b* pass, the widths of the third portions 121*a*3 and 121*b*3 of the third feed via 121*a* and the fourth feed via 121*b* passing through the third insulating layer 120 having a relatively low permittivity may be relatively wide compared to the widths of the first portions 121*a*1 and 121*b*1 and the second portions 121*a*2 and 121*b*2 of the third feed via 121*a* and the fourth feed via 121*b* passing through the first insulating layer 110*a* and the second insulating layer 110*b*.

The relatively wide widths of the third portions 121*a*3 and 121*b*3 of the third feed via 121*a* and the fourth feed via 121*b* increase the path lengths of the currents flowing along the surfaces of the third feed via 121*a* and the fourth feed via 121*b*, thereby enabling the bandwidth of the antenna apparatus 1000 to be widened without forming a separate coupling pattern.

In addition, the second antenna patch 31 may form an additional coupling with the third portions 121*a*3 and 121*b*3 of the third feed via 121*a* and the fourth feed via 121*b* having the relatively wide widths, thereby enabling the bandwidth of the antenna apparatus 1000 to be increased without forming a separate coupling pattern.

The plurality of ground vias 113 may pass through the first insulating layer 110*a* to be connected to the first antenna patch 21, and may be disposed around the third feed via 121*a* and the fourth feed via 121*b* to prevent electromagnetic signals transmitted by the third feed via 121*a* and the fourth feed via 121*b* from affecting the first antenna patch 21.

The antenna part 100 may be connected to the connecting substrate 200 through first connecting members 101, second connecting members 102, and third connecting members 103. The first connecting members 101 and the second connecting member 102 are disposed under the antenna part 100 on a lower surface of the first insulating layer 110*a* opposite to an upper surface of the first insulating layer 110*a* on which the third insulating layer 120 is disposed, and may include any one or any combination of any two or more of a solder ball, a pin, a land, a pad, and a solder-on-pad (SOP).

The first connecting members 101 of the connecting members 101, 102, and 103 of the antenna part 100 may be disposed on the lower surface of the first insulating layer 110*a* under the first feed via 111*a*, the second feed via 111*b*, the third feed via 121*a*, and the fourth feed via 121*b*. The second connecting members 102 of the connecting members 101, 102, and 103 of the antenna part 100 may be disposed on the lower surface of the first insulating layer 110*a* along edges of the lower surface of the first insulating layer 110*a*, and the third connecting members 103 of the connecting members 101, 102, and 103 of the antenna part 100 may be disposed on the lower surface of the first insulating layer 110*a* under the plurality of ground vias 113.

In the antenna apparatus 1000 according to the embodiment, by adjusting the widths of the third feed via 121*a* and the fourth feed via 121*b* that transmit the electromagnetic signals having different polarization characteristics to the second antenna patch 31, the bandwidth of the antenna apparatus 1000 may increase without forming a separate coupling pattern.

Figure 14:
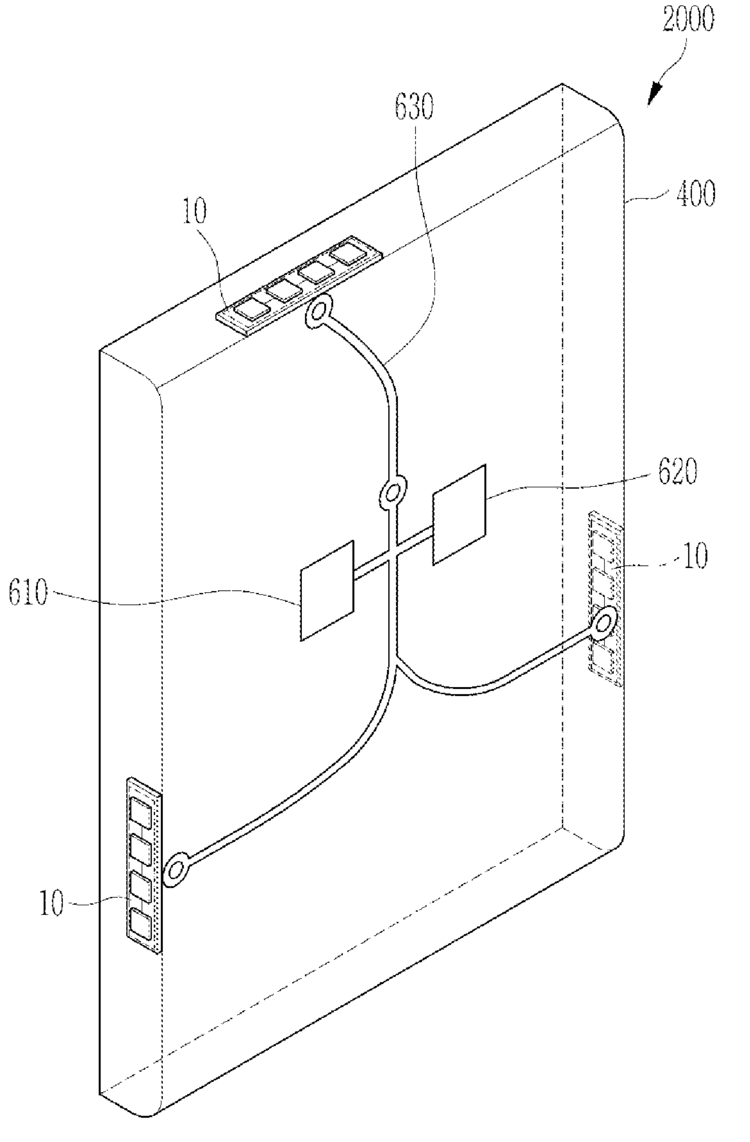
FIG. 14 illustrates a simplified view of an electronic device including an antenna apparatus according to an embodiment.

Hereinafter, an electronic device including an antenna according to an embodiment will be described with reference to FIG. 14. FIG. 14 illustrates a simplified view of an electronic device including an antenna apparatus according to an embodiment.

Referring to FIG. 14, an electronic device 2000 according to an embodiment includes antenna arrays 10 each including a plurality of antennas, and the antenna arrays 10 are disposed in a set 400 of the electronic device 2000.

The antenna arrays 10 each may include a plurality of antennas, and the plurality of antennas may include any of the antennas 100*a*, 100*a*1, 100*b*, 100*c*, 100*d*, 100*e*, and 100*f* and the antenna apparatus 1000 described above.

The electronic device 2000 may be a smart phone, a personal digital assistant, a digital video camera, a digital still camera, a network system, a computer, a monitor, a tablet, a laptop computer, a netbook computer, a television, a video game device, a smart watch, or an automotive part, but is not limited thereto.

The electronic device 2000 may have polygonal sides, and the antenna arrays 10 may be disposed adjacent to at least some of the sides of the electronic device 2000.

A communication module 610 and a baseband circuit 620 may be further disposed in the set 400. The antenna arrays 10 may be connected to the communication module 610 and/or the baseband circuit 620 through a coaxial cable 630.

In order to perform digital signal processing, the communication module 610 may include at least some of a memory chip such as a volatile memory (for example, a DRAM), a non-volatile memory (for example, a ROM), and a flash memory; an application processor chip such as a central processor (for example, a CPU), a graphics processor (for example, a GPU), a digital signal processor, a cryptographic processor, a microprocessor, and a microcontroller; and a logic chip such as an analog-to-digital converter and an application-specific IC (ASIC).

The baseband circuit 620 may perform analog-to-digital conversion, amplification, filtering, and frequency conversion on an analog signal to generate a baseband signal. The baseband signal inputted/outputted from the baseband circuit 620 may be transmitted to the antenna arrays 10 through the coaxial cable 630.

For example, the baseband signal may be transmitted to an IC through an electrical connection structure, a core via, and a wire. The IC may convert the baseband signal into an RF signal of a millimeter wave (mmWave) band.

Many features of the antennas 100*a*, 100*a*1, 100*b*, 100*c*, 100*d*, 100*e*, and 100*f* and the antenna apparatus 1000 according to the above-described embodiments are applicable to the electronic device 2000 including the antenna arrays 10.

Figure 15:
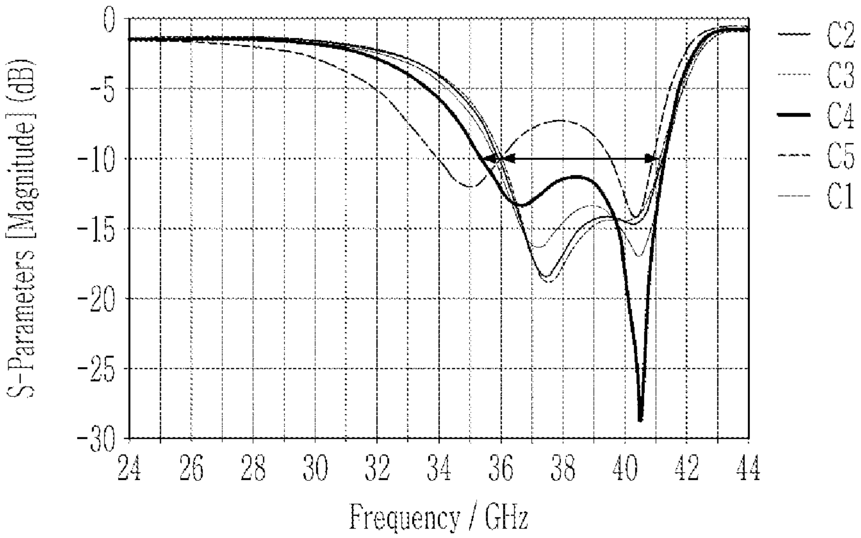
FIG. 15 illustrates a graph of results of an experimental example.

Hereinafter, an experimental example will be described with reference to FIG. 15 and Table 1 below. In the present experimental example, an antenna like the antenna apparatus 1000 described above was fabricated, and for a first case C1 in which the widths of the third portions 121*a*3 and 121*b*3 of the third feed via 121*a* and the fourth feed via 121*b* were the same as those of the first portions 121*a*1 and 121*b*1; for a second case C2 in which the widths of the third portions 121*a*3 and 121*b*3 of the third feed via 121*a* and the fourth feed via 121*b* were formed to be about 10 μm wider than those of the first portions 121*a*1 and 121*b*1; for a third case C3 in which the widths of the third portions 121*a*3 and 121*b*3 of the third feed via 121*a* and the fourth feed via 121*b* were formed to be about 30 μm wider than those of the first portions 121*a*1 and 121*b*1; for a fourth case C4 in which the widths of the third portions 121*a*3 and 121*b*3 of the third feed via 121*a* and the fourth feed via 121*b* were formed to be about 50 μm wider than those of the first portions 121*a*1 and 121*b*1; and for a fifth case C5 in which the widths of the third portions 121*a*3 and 121*b*3 of the third feed via 121*a* and the fourth feed via 121*b* were formed to be about 70 μm wider than those of the first portions 121*a*1 and 121*b*1, an S-parameter of the RF signal of the second bandwidth was measured, and the results are shown in FIG. 15, and the bandwidths in which the absolute values of the S-parameter are 10 dB or greater are shown in Table 1. In all of the first case C1 to the fifth case C5, the widths of the third portions 121*a*3 and 121*b*3 of the third feed via 121*a* and the fourth feed via 121*b* are narrower than the widths of the first hole 21*a* and the second hole 21*b* of the first antenna patch 21, so that the third feed via 121*a* and the fourth feed via 121*b* may pass through the antenna patch 21 by passing through the first hole 21*a* and the second hole 21*b*.

TABLE 1

| Case | Bandwidth |
|---|---|
| C1 | about 2.6 GHz |
| C2 | about 2.8 GHz |
| C3 | about 2.9 GHz |
| C4 | about 3.1 GHz |

Referring to FIG. 15 and Table 1, it can be seen that the bandwidth of the cases C2 to C4 in which the widths of the third portions 121*a*3 and 121*b*3 of the third feed via 121*a* and the fourth feed via 121*b* are formed to be wider than the widths of the first portions 121*a*1 and 121*b*1 is wider than the bandwidth of the case C1 in which the widths of the third portions 121*a*3 and 121*b*3 of the third feed via 121*a* and the fourth feed via 121*b* are formed to be the same as the widths of the first portions 121*a*1 and 121*b*1. However, it can be seen that a portion having an absolute value of the S-parameter of less than 10 was included in the fifth case C5, so that the signal strength of the antenna is weak. Accordingly, the case C5 has been omitted from Table 1. It can be seen that in the first case C1 to the fourth case C4, as the width of the third portions 121*a*3 and 121*b*3 increases, the bandwidth gradually increases. For example, it can be seen that in the fourth case C4, the bandwidth is increased by about 500 MHz compared to the first case C1. As such, it can be seen that according to the antenna according to the embodiments, by adjusting the width of the feed via, the bandwidth of the antenna may increase without forming a separate coupling pattern.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna comprising:

a first insulating layer;

a second insulating layer disposed on the first insulating layer in a height direction;

a third insulating layer disposed between the first insulating layer and the second insulating layer;

a feed via comprising a first portion passing through the first insulating layer, a second portion passing through the second insulating layer, and a third portion passing through the third insulating layer and connected to the first portion and the second portion; and an antenna patch disposed on the second insulating layer and fed from the feed via, wherein a permittivity of the third insulating layer is lower than a permittivity of the first insulating layer and a permittivity of the second insulating layer, and in a direction perpendicular to the height direction, a width of the third portion of the feed via is wider than either one or both of a width of the first portion of the feed via and a width of the second portion of the feed via.

2. The antenna of claim 1, wherein a thickness of the third insulating layer is thinner than a thickness of the first insulating layer and a thickness of the second insulating layer, measured in the height direction.

3. The antenna of claim 1, wherein the third insulating layer has an adhesive property.

4. The antenna of claim 1, wherein the width of the third portion is wider than the width of the first portion, and is wider than the width of the second portion.

5. The antenna of claim 4, wherein the width of the third portion is substantially the same as or smaller than a width of the antenna patch.

6. The antenna of claim 1, wherein the width of the third portion is wider than the width of the first portion; and the width of the third portion is substantially the same as the width of the second portion.

7. The antenna of claim 1, wherein the width of the third portion is wider than the width of the second portion; and the width of the third portion is substantially the same as the width of the first portion.

8. The antenna of claim 1, wherein the width of the first portion of the feed via is constant in the height direction;

the width of the second portion of the feed via is constant in the height direction; and the width of the third portion of the feed via varies in the height direction.

9. The antenna of claim 8, wherein the width of the third portion of the feed via gradually decreases moving away from the first portion toward the second portion in the height direction.

10. The antenna of claim 8, wherein the width of the third portion of the feed via gradually increases moving away from the first portion toward the second portion in the height direction.

11. The antenna of claim 1, wherein a planar shape of the third portion of the feed via is substantially the same as a planar shape of the first portion of the feed via and a planar shape of the second portion of the feed via.

12. The antenna of claim 1, wherein a planar shape of the third portion of the feed via is substantially the same as a planar shape of the antenna patch.

13. The antenna of claim 12, wherein the planar shape of the third portion of the feed via and the planar shape of the antenna patch are polygonal shapes.

14. An antenna comprising:

a first insulating layer;

a second insulating layer disposed on the first insulating layer in a height direction;

a third insulating layer disposed between the first insulating layer and the second insulating layer and having a lower permittivity than a permittivity of the first insulating layer and a permittivity of the second insulating layer;

a first feed via passing through the first insulating layer;

a second feed via comprising a first portion passing through the first insulating layer, a second portion passing through the second insulating layer, and a third portion passing through the third insulating layer and connected to the first portion and the second portion;

a first antenna patch disposed on the first insulating layer and fed from the first feed via; and a second antenna patch disposed on the second insulating layer and fed from the second feed via, wherein a width of the third portion of the second feed via is wider than either one or both of a width of the first portion of the second feed via and a width of the second portion of the second feed via.

15. The antenna of claim 14, wherein a thickness of the third insulating layer is thinner than a thickness of the first insulating layer and a thickness of the second insulating layer, measured in the height direction.

16. The antenna of claim 14, wherein the third insulating layer has an adhesive property.

17. The antenna of claim 14, further comprising a plurality of connecting members disposed on a lower surface of the first insulating layer opposite to an upper surface of the first insulating layer on which the third insulating layer is disposed.

18. The antenna of claim 17, wherein the plurality of connecting members comprise:

a plurality of first connecting members connected to the first feed via and the second feed via; and a plurality of second connecting members disposed along edges of the lower surface of the first insulating layer.

19. The antenna of claim 18, further comprising a ground via passing through the first insulating layer between the first feed via and the second feed via and connected to the first antenna patch.

20. The antenna of claim 19, wherein the plurality of connecting members further comprise a third connecting member connected to the ground via.

* * * * *